(12) United States Patent
Cassarly et al.

(10) Patent No.: US 6,488,389 B2
(45) Date of Patent: *Dec. 3, 2002

(54) IMAGE GENERATOR HAVING AN IMPROVED ILLUMINATION SYSTEM

(75) Inventors: William Cassarly, Lyndhurst, OH (US); Miller H. Schuck, III, Nederland, CO (US)

(73) Assignee: Three-Five Systems, Inc., Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/912,156

(22) Filed: Jul. 23, 2001

(65) Prior Publication Data

US 2002/0027779 A1 Mar. 7, 2002

Related U.S. Application Data

(63) Continuation of application No. 09/347,440, filed on Jul. 2, 1999, now Pat. No. 6,280,054.

(51) Int. Cl.[7] .............................. F21S 10/02; F21V 7/00
(52) U.S. Cl. ........................ 362/231; 362/240; 362/247
(58) Field of Search ................................. 362/230, 231, 362/240, 245, 247, 244, 346, 30; 40/564, 581, 444; 349/61, 69

(56) References Cited

U.S. PATENT DOCUMENTS

| | | | | | |
|---|---|---|---|---|---|
| 638,479 | A | * | 12/1899 | Scott | 40/564 |
| 3,868,501 | A | * | 2/1975 | Barbour | 362/231 |
| 4,587,601 | A | * | 5/1986 | Collins | 362/247 |
| 4,956,751 | A | * | 9/1990 | Kano | 362/231 |
| 5,136,483 | A | * | 8/1992 | Schoniger et al. | 362/231 |
| 5,278,744 | A | | 1/1994 | Geboers et al. | 362/348 |
| 5,967,652 | A | * | 10/1999 | Ramer et al. | 362/346 |
| 6,033,087 | A | * | 3/2000 | Shozo et al. | 362/244 |
| 6,045,238 | A | * | 4/2000 | Wheeler et al. | 362/247 |
| 6,280,054 | B1 | * | 8/2001 | Cassarly et al. | 362/231 |

* cited by examiner

Primary Examiner—Alan Cariaso
(74) Attorney, Agent, or Firm—Ingrassia Fisher & Lorenz, P.C.

(57) ABSTRACT

The invention provides an illumination system for a head-mounted display. The illumination system includes a plurality of illuminators which irradiate light over an area. The area has a central region where the light has a selective intensity, and outer regions on opposing sides of the central regions where the light has higher intensities than the selective intensity.

22 Claims, 7 Drawing Sheets

IMAGE GENERATOR HAVING AN IMPROVED ILLUMINATION SYSTEM

This application is a continuation of U.S. patent application Ser. No. 09/347,440, filed Jul. 2, 1999 now U.S. Pat. No. 6,280,054.

BACKGROUND OF THE INVENTION

1). Field of the Invention

This invention relates to visual display systems of the kind which are mounted to the head of a viewer.

2). Discussion of Related Art

Miniature display devices may be used in a number of ways, although they are particularly well suited for use in head-mounted displays. Head-mounted displays which are mounted on the head of a viewer have typically been bulky and large. These displays often use small cathode ray tubes to project an image toward a viewer's eye. Numerous head-mounted displays are known in the art. See, for example, the book Head-Mounted Displays, by James E. Melver, and Kirk Moffitt which is published by McGraw Hill. These displays are sometimes also referred to as displays which are brought to the head of a viewer.

Certain head-mounted displays use a liquid crystal technology to provide a visual display rather than cathode ray tubes. For example, U.S. Pat. No. 5,596,451 describes a miniature image generator which uses a liquid crystal display device in conjunction with magnifying mirrors to generate an image which may be used with a head-mounted display. Examples of liquid crystal display devices which may be used in this context may be found in U.S. Pat. No. 5,566,010 and U.S. Pat. No. 5,426,526.

While liquid crystal display devices in head-mounted displays provide certain advantages in terms of weight and bulk, these displays are often poorly suited for displaying high quality images because of short optical paths required by a small enclosure which houses the head-mounted display. For example, these displays, for purposes for miniaturization, usually include low f-number lenses. Low f-number lenses cause aberrations of light which travels through outer regions of such lenses. One such aberration is loss of image brightness.

SUMMARY OF THE INVENTION

The invention provides an illumination system for a head-mounted display. The illumination system includes a plurality of illuminators which radiate light over an area. The area has a central region where the light has a selected intensity, and outer regions, on opposing sides of the central region, where the light has higher intensities than the selected intensity.

According to another aspect of the invention, an illumination system for a head-mounted display is provided. A housing defines an enclosure having a reflective inner surface and having an opening out of the enclosure. One illuminator is located on one side of the opening in a position wherein light radiated from that illuminator reflects off the reflective surface and then passes through the opening of the enclosure. Another illuminator is located on a second, other side of the opening in a position wherein light radiated from that illuminator reflects off the reflective surface and then passes through the opening of the enclosure.

The invention also provides an image generator for a head-mounted display which includes an illuminator according to the invention.

A method of generating an image in a head-mounted display is also provided, wherein light is created over an area having central region where the light has a selected intensity, and outer regions, on opposing sides of the central region, where the light has higher intensities than the selected intensity. The light then passes through a lens and then illuminates a display.

BRIEF DESCRIPTION OF THE DRAWINGS

The invention is further described by way of example with reference to the accompanying drawings wherein.

DETAILED DESCRIPTION OF THE INVENTION

Figure 1:
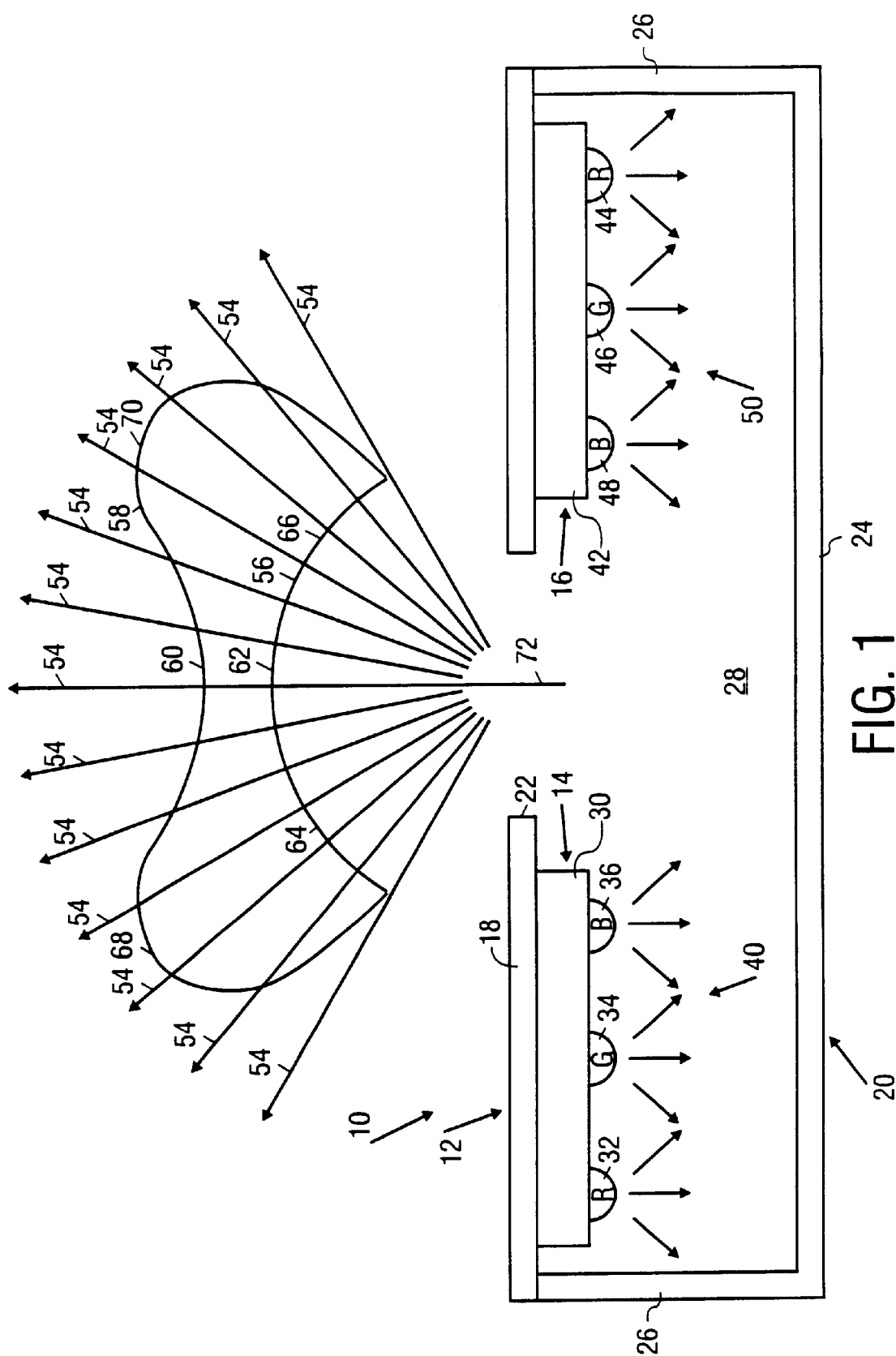
FIG. 1 is a sectioned plan view of an illumination system according to an embodiment of the invention and further illustrates the direction and intensity of light after leaving the illumination system and when passing through an area.

FIG. 1 of the accompanying drawings illustrates an illumination system 10 for a head-mounted display according to an embodiment of the invention. The illumination system includes a housing 12, a first light emitting diode (LED) package 14, and a second LED package 16.

The housing 12 includes a printed circuit board 18 and a cap 20. The printed circuit board 18 has an opening 22 formed therein. The opening 22 can have any suitable shape such as rectangular, oval or circular. The cap includes a central portion 24 and four side walls 26 (only two of which are shown) extending from edges of the central portion 24. When the cap 20 is located over the printed circuit board 18, the printed circuit board 18 and the cap 20 jointly define an enclosure 28. The opening 22 provides access to a central portion of the enclosure 28. Inner surfaces of the housing 10 are painted with a reflective white paint. The cap 20 may alternatively be made from a reflective white plastic material or any other material having high reflectivity. The paint or the cap 20 itself may be made of a material such as Teflon which has high reflectivity and a significant diffuse component. The enclosure 28 has a width of about 9.8 mm, a height of about 4.0 mm, and a depth into the paper of about 3.0 mm.

The first LED package 14 includes a substrate 30, a red LED 32, a green LED 34, and a blue LED 36. The LED's 32, 34, and 36 can be energized via the substrate 30.

The substrate 30 is secured to the printed circuit board 18 on an internal surface of the housing 10. The LED's 32, 34 and 36 can be electrically energized by electrically accessing the substrate 30 from the printed circuit board 18. The LED's 32,34, and 36 are, in effect, mounted in a first group 40 on one side of the opening 22.

The second LED package also includes a substrate 42, a red LED 44, a green LED 46, and a blue LED 48. The LED's 44, 46, and 48 are mounted to the substrate 42 and the substrate 42 is mounted to the printed circuit board 18 so that the LED's 44, 46, and 48 can be energized from the printed circuit board 18 via the substrate 42. The LED's 44, 46, and 48 are, in effect, located in a second group 50 on a side of the opening 22 opposing the first group 40.

Figure 3:
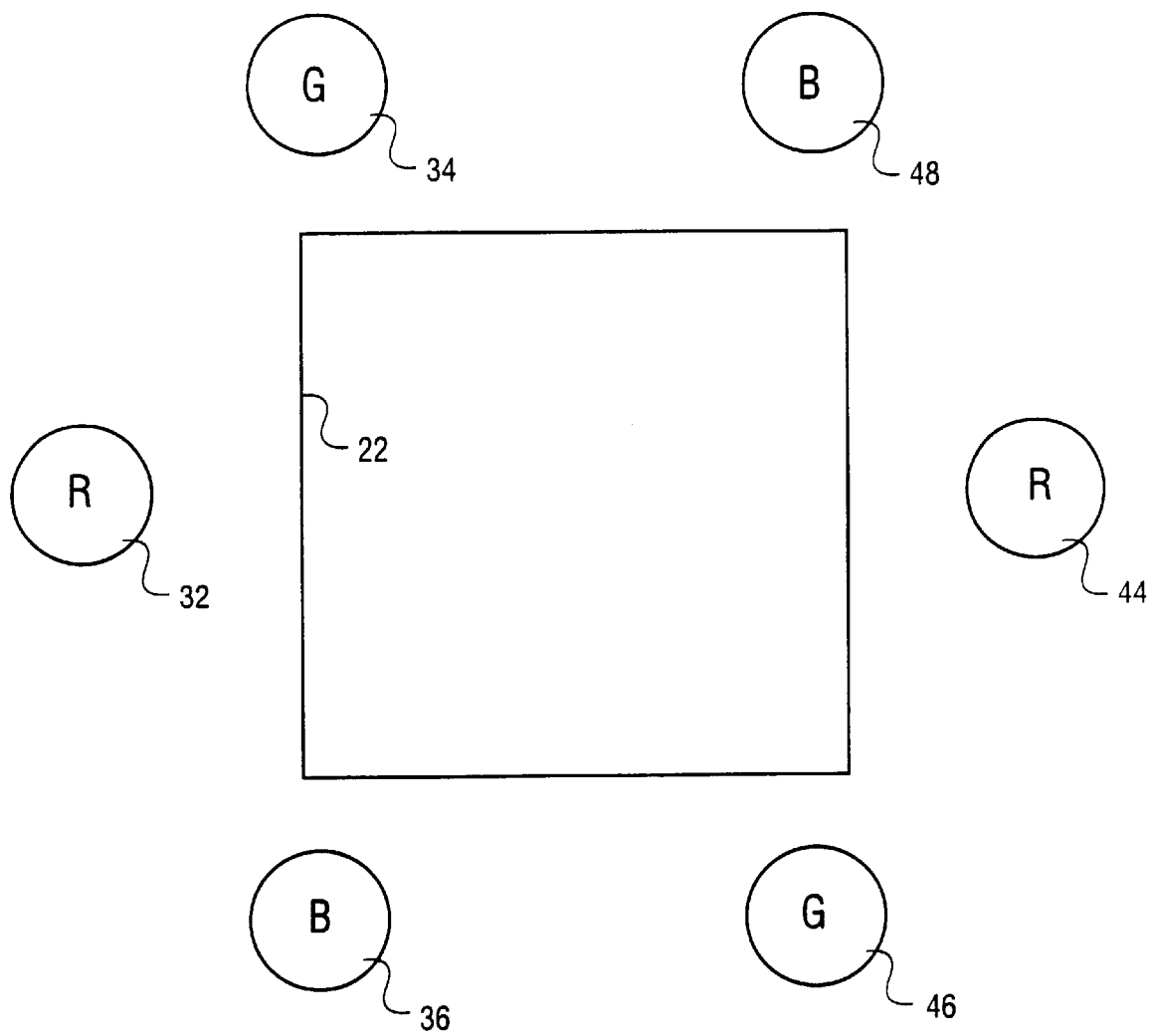
FIG. 3 is a front view illustrating how LED's of the system are arranged.

As shown in FIG. 3, the LED's are located in a circle around the opening 22. Each LED 32, 34, 36, 44, 46, or 48 is located by the same distance from a center of the opening 22. The center of the opening 22 is located between the red LED's 32 and 44. The center of the opening 22 is also located between the green LED's 34, and between the blue LED's 36 and 48.

The red LED's 32 and 44 are typically energized first. The red LED's 32 and 44 are then turned off at which time the green LED's 34 and 46 are energized. The green LED's 34 and 46 are then turned off at which time the blue LED's 36 and 48 are energized. The blue LED's 36 and 48 are then again turned off and the red LED's 32 and 44 are again energized.

The LED's 32 to 44 radiate light into the enclosure 28. The white painted inner surfaces of the housing 10 are reflective so that the light then reflects off the inner surfaces of the housing 10. Eventually the light finds its way radially outwardly from the opening 22, as indicated by the arrows 54.

A curved area 56 may be defined which intercepts the light 54 at right angles. The light 54 has an intensity over the area 56 which is indicated by the curve 58. Because of the identical distances of the LED's from the center of the opening 22 as illustrated in FIG. 3, the curve 58 has substantially the same shape for when the red LED's 32 and 44 are energized, when the green LED's 34 and 46 are energized, or when the blue LED's 36 and 48 are energized. The height of the curve may differ for the different color sets of LED's i.e. one color set may in total illuminate more than another set of the LED's.

As can be seen from the curve 58, the light has a selected intensity 60 in a central region 62 of the area 56. At outer regions 64 and 66 of the area 56, on opposing sides of the central region 62, the light has intensities 68 and 70 respectively which are higher than the selected intensity 60. The curve 58 has a first shape on a first side of a center line 72 through the opening 22, and a second shape on a second, opposing side of the center line 72, which is an exact mirror of the first shape. The intensities 68 and 70 are therefore substantially equal.

Figure 2:
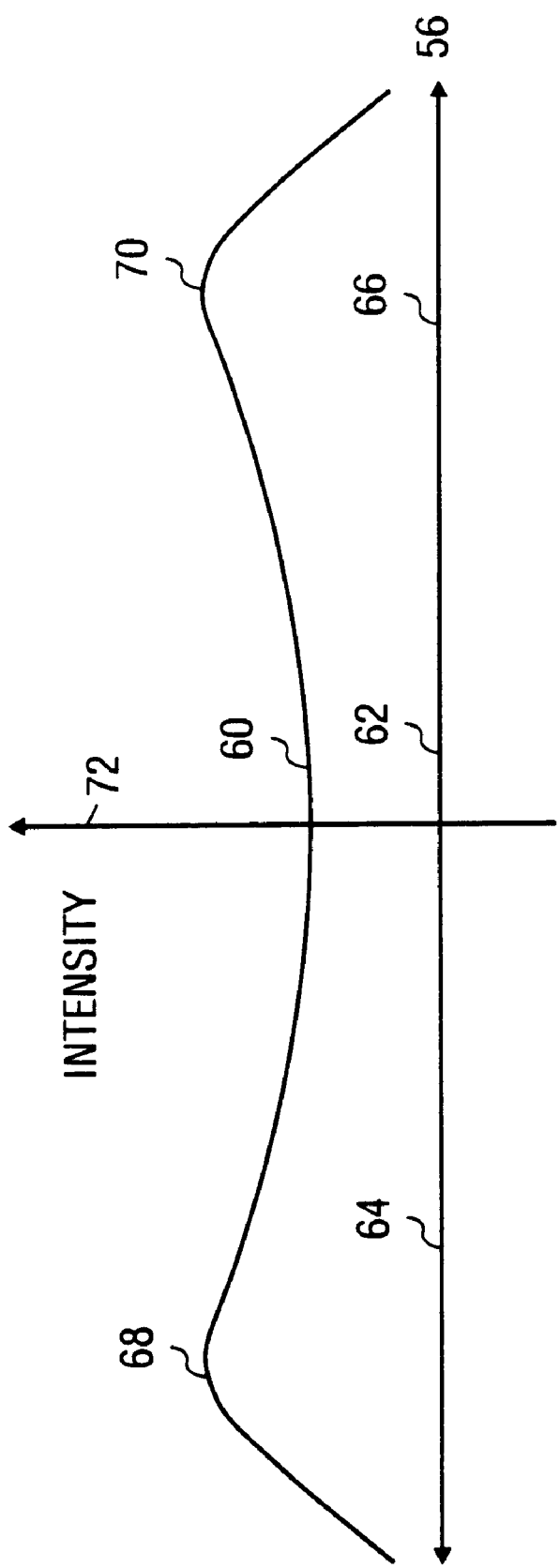
FIG. 2 is a graph illustrating a projection of the intensity of the light.

It should also be noted that the red LED's 32 and 44 are located by the same distances from the opening 22. The intensity of red light over the area 56 is therefore symmetrical on either side of the center line 72. The intensity of green light is also symmetrical about the center line 72 because of similar distances of the green LED's 34 and 46 from the opening 22. The intensity of blue light is also symmetrical about the center line 72 because of similar distances of the blue LED's 36 and 48 from the opening 22. FIG. 2 illustrates the intensity of light over the area 56, about the center line 72, where the area 56 is projected on a straight x-axis.

By reflecting light from surfaces of the housing 10, an output can be "tailored" by altering the dimensions of the housing and other characteristics such as reflective characteristics within the housing 10. By reflecting the light better color mixing can also be achieved when using multiple LED's when compared to, for example, directly imaging LED's. For an even more uniform output, a diffusing or other film such as a brightness enhancing film (BEF) or a combination of films may be located over the opening 22.

Figure 4:
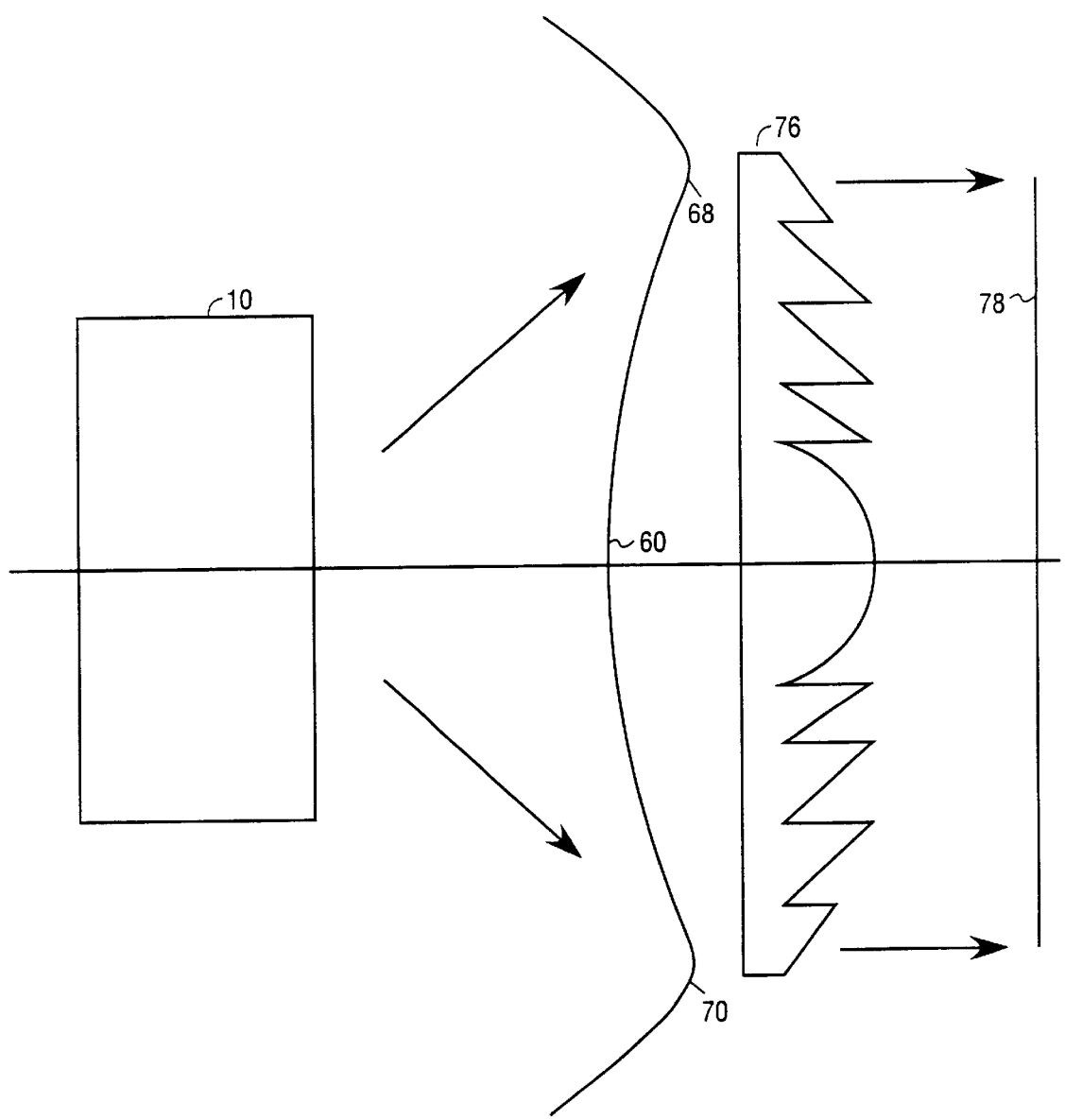
FIG. 4 is a plan view illustrating the use of the illumination system with a Fresnel lens.

FIG. 4 illustrates the illumination system 10 which is used in conjunction with a Fresnel lens 76. The illumination system 10 radiates light over one side of the Fresnel lens 76. Because the LED's 32, 34, 36, 44, 46 and 48 are located in such a circle, a circular area of the Fresnel lens 76 is well illuminated. Another lens, having a different shape, may be illuminated differently. The light reaching the Fresnel lens has an intensity which varies over the Fresnel lens so that the intensity 68 or 70 of the light is more at outer regions of the Fresnel lens 76 than the intensity 60 in a central region of the Fresnel lens 76.

In order to miniaturize an image generator including the illumination system 10 and the Fresnel lens 76, it may be required to locate the Fresnel lens 76 as close as possible to the illumination system 10. Locating the Fresnel lens 76 very close to the illumination system 10 may require the Fresnel lens 76 to have a lower f-number, for example an f-number of less than 1. A low f-number Fresnel lens will result in a reduction in intensity of light, passing therethrough, at outer regions thereof. However, because the intensity of the light is higher at outer regions before passing through the Fresnel lens 76, the light has an intensity 78 which is substantially uniform after passing through the Fresnel lens 76. Because of the uniform intensity 78 of the light after passing through the Fresnel lens 76, an image can be more uniformly illuminated. In one example the Fresnel lens 76 has an f-number of 0.78 and is spaced from the illumination system 10 by a distance of 7.25 mm.

Figure 5:
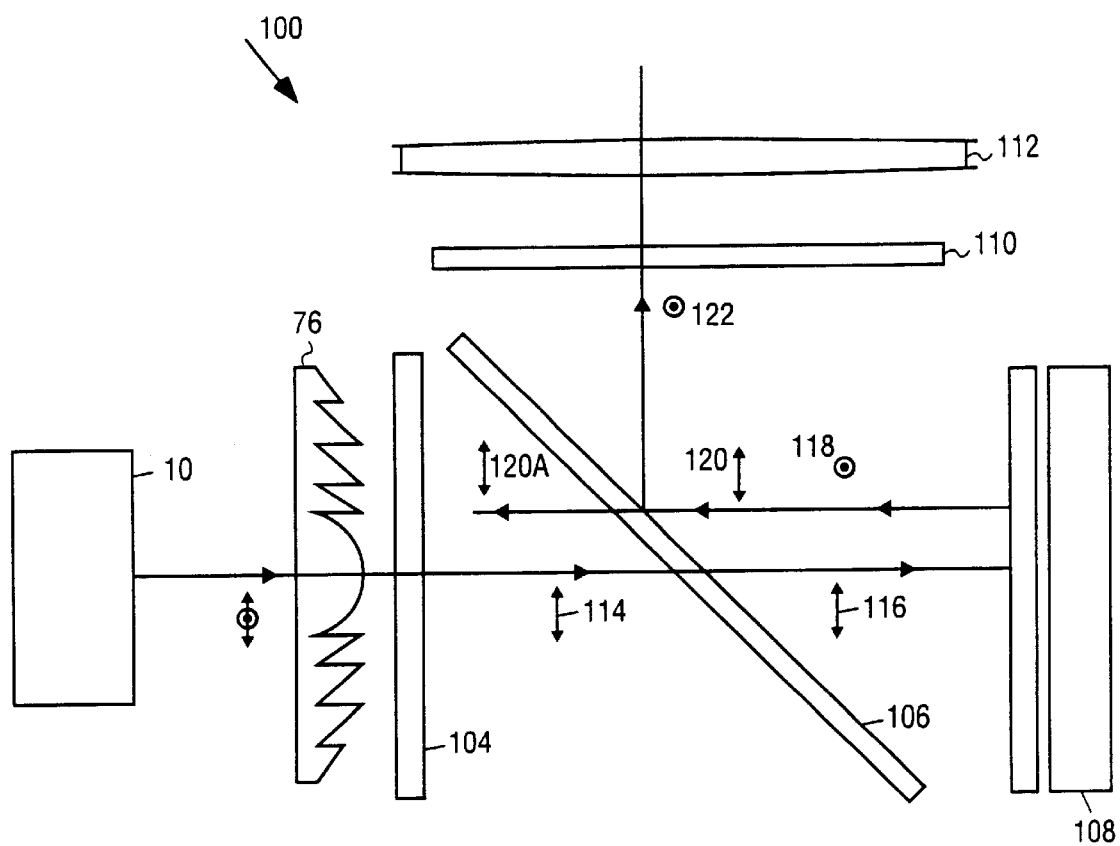
FIG. 5 is a plan view of an image generator which includes the illumination system and the Fresnel lens of the FIG. 3.

The illumination system 10 may be used in a variety of different image generators. FIG. 5, for example, illustrates a typical image generator 100 which includes an illuminator 10 and a Fresnel lens 76 as in FIG. 3. The image generator further includes a first polarizer 104, a beamsplitter 106, a liquid crystal on silicon (LCOS) display 108, a second polarizer 110, and an magnifying lens 112.

The illumination system 10 radiates light sequentially for a series of frames. For the first frame, the illumination system 10 sends out a red pulse of light, followed by a green pulse of light, followed by a blue pulse of light. For the following frame, the illumination system again sends out a red pulse of light, a green pulse of light, and a blue pulse of light, and so on. Light leaving the illumination system 10 is multi-directional, i.e. unpolarized.

The light then travels through the Fresnel lens 76 which is used for directing light in substantially parallel rays through the first polarizer 104. The first polarizer 104 polarizes the light so that the light, for example, is polarized in a horizontal direction 114 (p-polarization).

The light then travels through the beamsplitter 106. The beamsplitter 106 only allows light through which is polarized in a horizontal direction 116.

The LCOS display includes a number of pixels. One skilled in the art would appreciate that light reflected from a pixel, of a liquid crystal display, which is energized causes the light to rotate, i.e. to change its polarization. (Another liquid crystal display may work the other way around in that pixels which are not energized rotate the polarity of the light). Some pixels may thus be selectively energized so that light reflected from certain areas of the liquid crystal display changes its polarization to a vertical direction 118

(s-polarization). The other pixels may remain unenergized so that light reflected from them has a plurality which remains in a horizontal direction 120. An image which is desired to be viewed can so be created in areas of the liquid crystal display where the pixels thereof are polarized and the polarization of the light is changed. It should be noted that the pixels are energized in a time sequential manner so that a moving image can be created having a plurality of sequential frames. Each frame has three subframes. The first subframe is synchronized with a red pulse from the illumination system 10, the second subframe is synchronized with a green pulse from the illumination system 10, and the third subframe is synchronized with a blue pulse from the illumination system 10. A color image can so be created in each frame.

The light leaving the LCOS display 108 is directed back towards the beamsplitter 106. The beamsplitter 106 has the capability of reflecting light having a vertical polarization, but not light having a horizontal polarization so that light leaving the beamsplitter 106 only includes light which is polarized in a vertical direction 122. Light having a horizontal polarization 120A passes through the beamsplitter 106. The beamsplitter 106 is at an angle of about 45° so that the light reflected therefrom travels in a direction which is at right angles to the direction of travel of the light thus far.

The light then travels through the second polarizer 110 which "cleans up" the light by removing any undesirable horizontally polarized stray light. The light then passes through the magnifying lens 112 to a viewers eye.

Further details of the image generator 100 are described in U.S. patent application Ser. No. 09/222,230 which is assigned to the same assignee as the present application, details of which are incorporated by reference therein.

Figure 6:
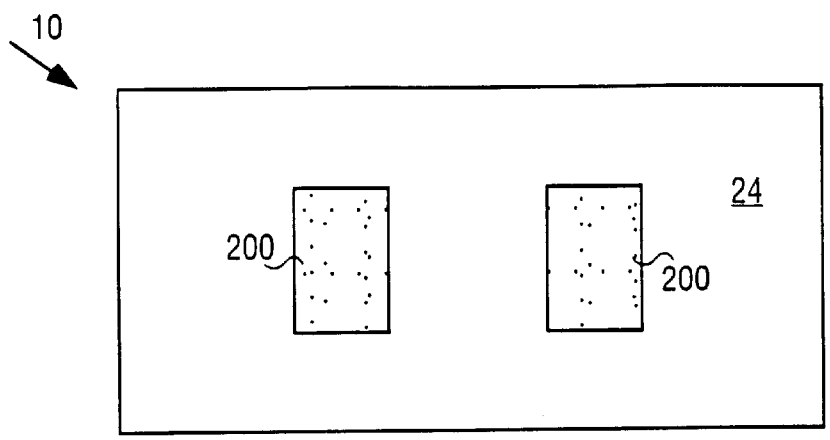
FIG. 6 is a front view illustrating the illuminator which further includes a mirror.
Figure 7:
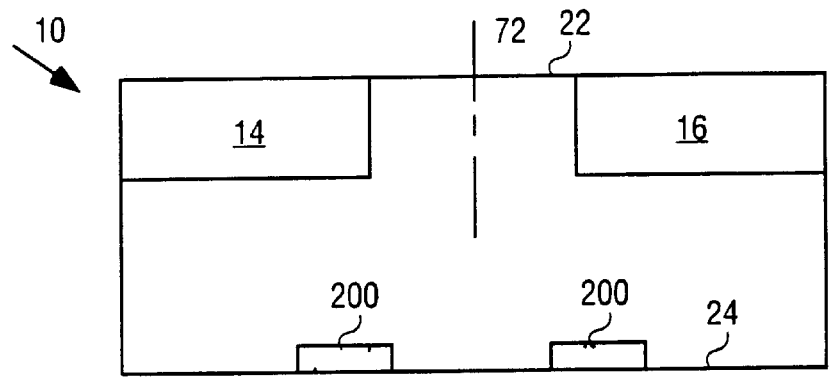
FIG. 7 is a plan view of the illuminator of FIG. 6.

FIG. 6 and FIG. 7 illustrate the illuminator 10 which further includes two mirrors 200. The mirrors 200 are located on the central portion 24. In use, the mirror 200 assists in "tailoring" light within the illuminator 10 to obtain a required output distribution. Light is reflected from each mirror 200 through the opening 22. Very little of the light reflected from the mirrors 200 form on the center line 72 on a Fresnel lens. For that reason, a gap is provided between the mirrors 200. Light reflects in a diffused manner from a surface of the central portion 24 between the mirrors 200, and ensure that some light shines near and on the center line 72 of a Fresnel lens.

Figure 8:
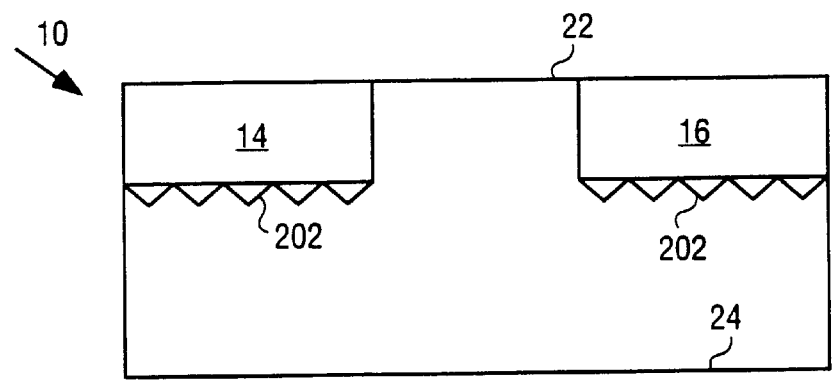
FIG. 8 is a plan view illustrating the illuminator which further includes brightness enhancing film.

FIG. 8 illustrates the illuminator 10 which further includes a brightness enhancing film 202 on each LED package 14 and 16. The brightness enhancing film 202 may for example be film sold as BEFII by 3M Corporation. The angular distribution from each LED package 14 or 16 is changed by the brightness enhancing film 202. Light leaving the illuminator will have an altered angular distribution, and a correspondingly altered output distribution, due to the use of the brightness enhancing film 202.

Figure 9:
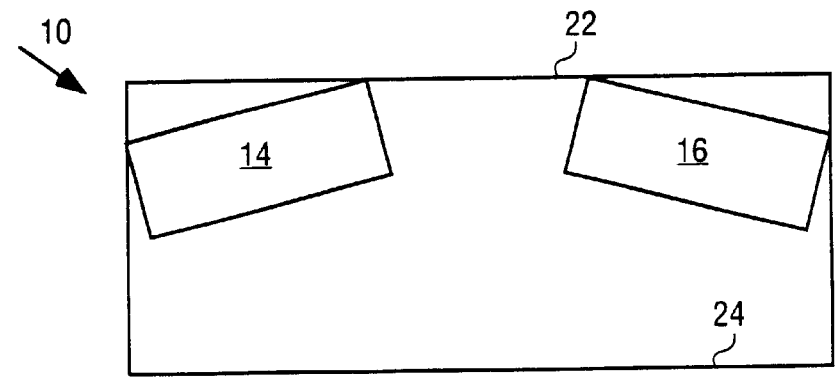
FIG. 9 is a plan view illustrating the illuminator wherein LED packages thereof are tilted.

FIG. 9 illustrates the illuminator 10 wherein the LED packages 14 or 16 are titled by about 30 degrees so that light emanating therefrom shines more onto a center of the central portion 24. By tilting the LED packages 14 or 16, a required output can be obtained.

Figure 10:
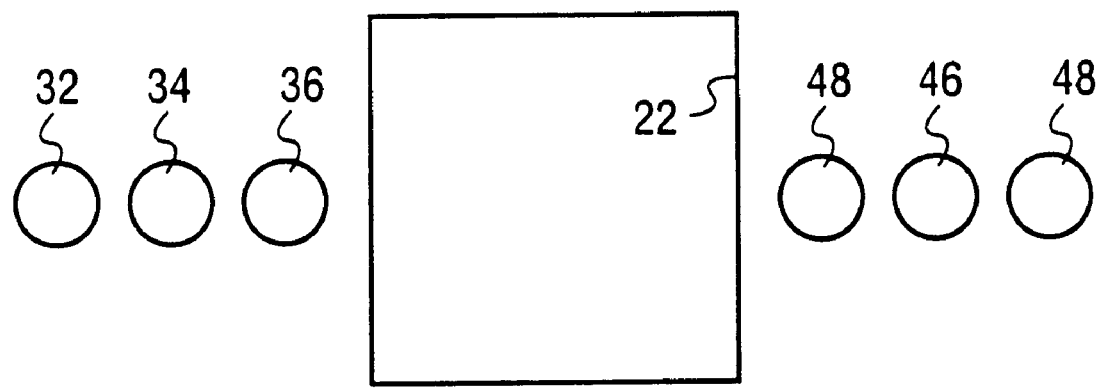
FIG. 10 is a front view of an illuminator having LED's located in a line.

FIG. 10 illustrates the illuminator 10 with LED's 32, 34, 36, 44, 46, and 48 located in a line. The embodiment shown in FIG. 3 may be preferred because of more uniform distribution of light. The FIG. 10 embodiment may however be suitable for certain applications. By configuring a housing for the embodiment of FIG. 10, it may be possible to tailor light leaving such a housing so as to achieve a required output.

While certain exemplary embodiments have been described and shown in the accompanying drawings, it is to be understood that such embodiments are merely illustrative and not restrictive of the current invention, and that this invention is not restricted to the specific constructions and arrangements shown and described, since modifications may occur to those ordinarily skilled in the art.

What is claimed:

1. An illumination system comprising:

a plurality of illuminators radiating light over an area of an object to be illuminated, having a central region where the light has a selected intensity, and outer regions, on opposing sides of the central region, where the light has higher intensities than the selected intensity and wherein the intensity of the light at one of the outer regions is substantially equal to the intensity of the light at the other outer region;

such that illumination of the area of a display situated proximate to an eye is provided.

2. An illumination system according to claim 1, further comprising:

a reflective surface from which the light reflects before illuminating the area of the object to be illuminated.

3. An illumination system according to claim 2 wherein the illuminators are located in a first group and a second group, the light passing through a space between the first and second groups after being reflected from the reflective surface and before illuminating the area of the object to be illuminated, the illuminators of each group comprising at least a red illuminator, a green illuminator, and a blue illuminator.

4. An illumination system according to claim 3 wherein each illuminator is spaced by a respective distance from a center of the space, the respective distances being substantially equal.

5. An illumination system comprising:

a plurality of illuminators radiating light over an area, of an object to be illuminated, having a central region where the light has a selected intensity, and outer regions, on opposing sides of the central region, where the light has higher intensities than the selected intensity and wherein the intensity of the light at one of the outer regions is substantially equal to the intensity of the light at the other outer region;

at least a first illuminator and a second illuminator, the first illuminator creating light having a first color and the second illuminator creating light having a second color which is different from the first color, the light from the first illuminator and the second illuminator being radiated over the area of the object to be illuminated;

such that illumination of the area of a display situated proximate to an eye is provided.

6. An illumination system according to claim 5, further comprising:

at least a third illuminator and a fourth illuminator, the third illuminator creating light having the first color and the fourth illuminator creating light having the second color, the light from the first, second, third, and fourth illuminators being radiated over the area of the object to be illuminated.

7. An illumination system according to claim 6, wherein the first and third illuminators are spaced by a distance which substantially equals a distance by which the second and fourth illuminators are spaced.

8. An illumination system according to claim 5 further comprising:
a reflective surface from which the light reflects before illuminating the area of the object to be illuminated.

9. An illumination system according to claim 8 wherein the illuminators are located in a first group and a second group, the light passing through a space between the first and second groups after being reflected from the reflective surface and before illuminating the area of the object to be illuminated, the illuminators of each group comprising at least a red illuminator, a green illuminator, and a blue illuminator.

10. An illumination system according to claim 9 wherein each illuminator is spaced by a respective distance from a center of the space, the respective distances being substantially equal.

11. An illumination system comprising:
a plurality of illuminators radiating light over an area, of an object to be illuminated, having a central region where the light has a selected intensity, and outer regions, on opposing sides of the central region, where the light has higher intensities than the selected intensity and wherein the intensity of the light at one of the outer regions is substantially equal to the intensity of the light at the other outer region;
at least a first illuminator which creates red light, a second illuminator which creates green light, and a third illuminator which creates blue light, the light from the first, second, and third illuminators being radiated over the area of the object to be illuminated;
such that illumination of the area of a display situated proximate to an eye is provided.

12. An illumination system according to claim 11, further comprising:
at least a fourth illuminator which creates red light, a fifth illuminator which creates green light, and a sixth illuminator which creates blue light, the light from the first, second, third, fourth, fifth and sixth illuminators being radiated over the area of the object to be illuminated.

13. An illumination system according to claim 11, further comprising:
a reflective surface from which the light reflects before illuminating the area of the object to be illuminated.

14. An illumination system according to claim 13 wherein the illuminators are located in a first group and a second group, the light passing through a space between the first and second groups after being reflected from the reflective surface and before illuminating the area of the object to be illuminated, the illuminators of each group comprising at least a red illuminator, a green illuminator, and a blue illuminator.

15. An illumination system according to claim 14 wherein each illuminator is spaced by a respective distance from a center of the space, the respective distances being substantially equal.

16. An illumination system comprising:
a housing defining an enclosure having a reflective inner surface, the housing having an opening out of the enclosure;
one illuminator located on a first side of the opening in a position wherein light radiated from that illuminator reflects off the reflective surface at least once and then passes through the opening and out of the enclosure;
another illuminator located on a second side of the opening in a position wherein light radiated from that illuminator reflects off the reflective surface at least once and then passes through the opening and out of the enclosure, the light leaving the opening has an intensity distribution over an area wherein the distribution of the intensity on one side of the area is substantially a mirror image of the distribution of the intensity on an opposing side of the area;
such that illumination of the area of a display situated proximate to an eye is provided.

17. An illumination system according to claim 16, further comprising:
a first group of illuminators, on the first side of the opening, comprising a first illuminator, a second illuminator, and a third illuminator, at least one of the first, second, and third illuminators creating red light, one creating green light, and one creating blue light; and
a second group of illuminators, on the second side of the opening, comprising a fourth illuminator, a fifth illuminator, and a sixth illuminator, at least one of the fourth, fifth, and sixth illuminators creating red light, one creating green light, and one creating blue light.

18. An illumination system according to claim 17 wherein the first, second, third, fourth, fifth, and sixth illuminators are each located by a respective distance from a center of the opening, the distances being substantially equal.

19. An illumination system for a display situated proximate to an eye, comprising:
a first illuminator which creates red light;
a second illuminator which creates green light;
a third illuminator which creates blue light, the first second and third illuminators being located in a first group;
a fourth illuminator which creates red light;
a fifth illuminator which creates green light;
a sixth illuminator which creates blue light, the fourth, fifth, and sixth illuminators being located in a second group, the illuminators being located in a circle, the first and fourth illuminators being spaced by a distance which is substantially the same as the distance by which the second and fifth illuminators are spaced, which is substantially the same as a distance by which the third and sixth illuminators are spaced;
a reflective surface from which light from the first, second, third, fourth, fifth, and sixth illuminators reflects, where after the light passes through a space between the first and second groups, where after the light passes through an area over which the light from the first, second, third, fourth, fifth, and sixth illuminators is radiated, the area having a central region where the light has a selected intensity, and the outer regions, on opposing sides of the central region, where the light has higher intensities than the selected intensity/the intensity of the light at one of the outer regions is substantially equal to the intensity of the light at the other outer region, and light having an intensity distribution in the one outer region which is substantially a mirror image of an intensity distribution of the light in the other outer region.

20. An image generator for a display situated proximate to an eye, comprising:
a plurality of illuminators wherein light radiated from the illuminators reflects off a reflective surface at least once and then radiates over an area having a central region where light has a selected intensity, and outer regions, on opposing sides of the central region, where the light has higher intensities than the selected intensity;
a lens located in a position wherein the light passes therethrough; and
a display which the light illuminates after leaving the lens.

21. An image generator according to claim 20 wherein the lens has an f-number which is less than 1.

22. A method of generating an image in a display situated proximate to an eye, comprising:

creating light, utilizing a plurality of illuminators, wherein light created therefrom reflects off a reflective surface at least once and radiates over an area having a central region where the light has a selected intensity, and outer regions, on opposing sides of the central region, where the light has higher intensities than the selected intensity whereafter the light passes through a lens and then illuminates a display.

* * * * *